(12) United States Patent
Grafenauer

(10) Patent No.: US 7,431,979 B2
(45) Date of Patent: Oct. 7, 2008

(54) WOOD FIBERBOARD

(75) Inventor: Thomas Grafenauer, Onzour sur Loire (FR)

(73) Assignee: Kronotec AG, Lucerne (CH)

( * ) Notice: Subject to any disclaimer, the term of this patent is extended or adjusted under 35 U.S.C. 154(b) by 429 days.

(21) Appl. No.: 10/697,561

(22) Filed: Oct. 31, 2003

(65) Prior Publication Data
US 2004/0123542 A1    Jul. 1, 2004

(30) Foreign Application Priority Data
Nov. 12, 2002   (DE)   ................ 102 52 863

(51) Int. Cl.
*B32B 21/10*   (2006.01)
(52) U.S. Cl. ............ 428/292.4; 428/45; 52/783.1
(58) Field of Classification Search ........ 156/235, 156/247, 288, 289; 428/198, 195, 213, 210, 428/292.4, 44, 45; 442/413, 394; 52/783.1, 52/794.1
See application file for complete search history.

(56) References Cited
U.S. PATENT DOCUMENTS

| | | | |
|---|---|---|---|
| 213,740 A | 4/1879 | Conner | |
| 623,562 A | 4/1899 | Rider | |
| 714,987 A | 12/1902 | Wolfe | |
| 753,791 A | 3/1904 | Fulghum | |
| 1,018,198 A * | 2/1912 | Philpot et al. | |
| 1,124,228 A | 1/1915 | Houston | |
| 1,361,501 A * | 12/1920 | Schepmoes | 52/591.3 |
| 1,407,679 A | 2/1922 | Ruthrauff | |
| 1,454,250 A | 5/1923 | Parsons | |
| 1,468,288 A | 9/1923 | Een | |
| 1,477,813 A | 12/1923 | Daniels | |
| 1,510,924 A | 10/1924 | Daniels et al. | |
| 1,540,128 A | 6/1925 | Houston | |
| 1,575,821 A | 3/1926 | Daniels | |
| 1,602,256 A | 10/1926 | Sellin | |
| 1,602,267 A | 10/1926 | Karwisch | |
| 1,615,096 A | 1/1927 | Meyers | |
| 1,622,103 A | 3/1927 | Fulton | |
| 1,622,104 A | 3/1927 | Fulton | |
| 1,637,634 A | 8/1927 | Carter | |
| 1,644,710 A | 10/1927 | Crooks | |

(Continued)

FOREIGN PATENT DOCUMENTS

AU    200 020703    1/2000

(Continued)

OTHER PUBLICATIONS

U.S. Court of Appeals for the Federal Circuit Decision in *Alloc, Inc. et al.* vs. *International Trade Commission and Pergs, Inc. et al.* decided Sep. 10, 2003.

(Continued)

*Primary Examiner*—N Edwards
(74) *Attorney, Agent, or Firm*—Greenblum & Bernstein, P.L.C.

(57) ABSTRACT

A wood fiberboard, in particular floor panel including an HDF support board with a top side and an underside, the top side having a decoration, preferably a wood or tile decoration, is distinguished in that the decoration is printed directly onto the top side of the support board and is covered by at least one layer of a transparent synthetic resin.

9 Claims, 1 Drawing Sheet

U.S. PATENT DOCUMENTS

| | | | |
|---|---|---|---|
| 1,660,480 A | 2/1928 | Daniels | |
| 1,714,738 A | 5/1929 | Smith | |
| 1,718,702 A | 6/1929 | Pfiester | |
| 1,734,826 A | 11/1929 | Pick | |
| 1,764,331 A | 6/1930 | Moretz | |
| 1,776,188 A | 9/1930 | Langb'aum | |
| 1,778,069 A | 10/1930 | Fetz | |
| 1,779,729 A | 10/1930 | Bruce | |
| 1,787,027 A | 12/1930 | Wasleff | |
| 1,823,039 A | 9/1931 | Gruner | |
| 1,859,667 A | 5/1932 | Gruner | |
| 1,898,364 A | 2/1933 | Gynn | |
| 1,906,411 A | 5/1933 | Potvin | |
| 1,921,164 A | 8/1933 | Lewis | |
| 1,929,871 A | 10/1933 | Jones | |
| 1,940,377 A | 12/1933 | Storm | |
| 1,946,648 A | 2/1934 | Taylor | |
| 1,946,690 A * | 2/1934 | Haines | 52/386 |
| 1,953,306 A | 4/1934 | Moratz | |
| 1,986,739 A | 1/1935 | Mitte | |
| 1,988,201 A | 1/1935 | Hall | |
| 2,023,066 A | 12/1935 | Curtis et al. | |
| 2,044,216 A | 6/1936 | Klages | |
| 2,065,525 A | 12/1936 | Hamilton | |
| 2,123,409 A | 7/1938 | Elmendorf | |
| 2,142,305 A * | 1/1939 | Davis | 52/592.1 |
| 2,220,606 A | 11/1940 | Malarkey et al. | |
| 2,276,071 A | 3/1942 | Scull | |
| 2,280,071 A | 4/1942 | Hamilton | |
| 2,324,628 A | 7/1943 | Kähr | |
| 2,328,051 A | 8/1943 | Bull | |
| 2,398,632 A | 4/1946 | Frost et al. | |
| 2,430,200 A | 11/1947 | Wilson | |
| 2,740,167 A | 4/1956 | Rowley | |
| 2,816,851 A * | 12/1957 | Ardledter | 428/211.1 |
| 2,894,292 A | 7/1959 | Gramelspacker | |
| 2,914,109 A * | 11/1959 | Hsu et al. | 264/293 |
| 2,928,124 A * | 3/1960 | Hugger | 264/284 |
| 2,946,713 A * | 7/1960 | Dusina, Jr. et al. | 264/413 |
| 3,045,294 A | 7/1962 | Livezey, Jr. | |
| 3,100,556 A | 8/1963 | De Ridder | |
| 3,125,138 A | 3/1964 | Bolenbach | |
| 3,135,643 A * | 6/1964 | Michl | 428/211.1 |
| 3,182,769 A | 5/1965 | De Ridder | |
| 3,192,294 A * | 6/1965 | Glover et al. | 264/54 |
| 3,203,149 A | 8/1965 | Soddy | |
| 3,204,380 A | 9/1965 | Smith et al. | |
| 3,267,630 A | 8/1966 | Omholt | |
| 3,282,010 A | 11/1966 | King, Jr. | |
| 3,286,006 A | 11/1966 | Annand | |
| 3,310,919 A | 3/1967 | Bue et al. | |
| 3,347,048 A | 10/1967 | Brown et al. | |
| 3,362,266 A * | 1/1968 | Krafft | 408/10 |
| 3,387,330 A * | 6/1968 | Lemelson | 425/112 |
| 3,460,304 A | 8/1969 | Braeuninger et al. | |
| 3,481,810 A | 12/1969 | Waite | |
| 3,526,420 A | 9/1970 | Brancaleone | |
| 3,538,665 A | 11/1970 | Gohner | |
| 3,553,919 A | 1/1971 | Omholt | |
| 3,555,762 A | 1/1971 | Constanzo, Jr. | |
| 3,608,258 A | 9/1971 | Spratt | |
| 3,694,983 A | 10/1972 | Couquet | |
| 3,714,747 A | 2/1973 | Curran | |
| 3,720,027 A | 3/1973 | Christensen | |
| 3,731,445 A | 5/1973 | Hoffman et al. | |
| 3,741,851 A * | 6/1973 | Erb et al. | 428/161 |
| 3,759,007 A | 9/1973 | Thiele | |
| 3,760,548 A | 9/1973 | Sauer et al. | |
| 3,768,846 A | 10/1973 | Hensley et al. | |
| 381,774 | 5/1974 | Pittman | |
| 3,853,578 A | 12/1974 | Suzuki et al. | |
| 3,859,000 A | 1/1975 | Webster | |
| 3,878,030 A | 4/1975 | Cook | |
| 3,902,293 A | 9/1975 | Witt et al. | |
| 3,908,053 A | 9/1975 | Hettich | |
| 3,912,569 A | 10/1975 | Kapral | |
| 3,936,551 A | 2/1976 | Elmendorf et al. | |
| 3,936,624 A * | 2/1976 | Andersen et al. | 200/283 |
| 3,988,187 A | 10/1976 | Witt et al. | |
| 4,006,048 A * | 2/1977 | Cannady et al. | 156/90 |
| 4,076,867 A * | 2/1978 | Lewicki et al. | 427/264 |
| 4,090,338 A | 5/1978 | Bourgade | |
| 4,091,136 A | 5/1978 | O'Brian et al. | |
| 4,091,154 A * | 5/1978 | Hirai | 428/158 |
| 4,099,358 A | 7/1978 | Compaan | |
| 4,118,533 A | 10/1978 | Hipchen et al. | |
| 4,131,705 A | 12/1978 | Kubinsky | |
| 4,164,832 A | 8/1979 | Van Zandt | |
| 4,169,688 A | 10/1979 | Toshio | |
| 4,242,390 A | 12/1980 | Nemeth | |
| 4,243,716 A | 1/1981 | Kosaka et al. | |
| 4,245,689 A | 1/1981 | Grard et al. | |
| 4,246,310 A | 1/1981 | Hunt et al. | |
| 4,263,081 A * | 4/1981 | Scher et al. | 156/279 |
| 4,290,248 A | 9/1981 | Kemerer et al. | |
| 4,293,360 A * | 10/1981 | Loft et al. | 156/230 |
| 4,299,070 A | 11/1981 | Oltmanns et al. | |
| 4,327,141 A * | 4/1982 | Scher et al. | 428/148 |
| 4,374,886 A * | 2/1983 | Raghava | 428/172 |
| 4,409,280 A * | 10/1983 | Wiley et al. | 428/203 |
| 4,422,854 A * | 12/1983 | Hahnle et al. | 8/471 |
| 4,426,820 A | 1/1984 | Terbrack et al. | |
| 4,431,044 A | 2/1984 | Bruneau | |
| 4,471,012 A | 9/1984 | Maxwell | |
| 4,501,102 A | 2/1985 | Knowles | |
| 4,520,062 A | 5/1985 | Ungar et al. | |
| 4,561,233 A | 12/1985 | Harter et al. | |
| 4,585,685 A | 4/1986 | Forry et al. | |
| 4,599,259 A * | 7/1986 | Kobayashi et al. | 428/204 |
| 4,612,745 A | 9/1986 | Hovde | |
| 4,620,892 A * | 11/1986 | Dodson et al. | |
| 4,641,469 A | 2/1987 | Wood | |
| 4,644,672 A * | 2/1987 | Dassler et al. | 36/134 |
| 4,653,242 A | 3/1987 | Ezard | |
| 4,654,244 A | 3/1987 | Eckert et al. | |
| 4,688,560 A * | 8/1987 | Schultz | 606/73 |
| 4,689,102 A * | 8/1987 | Prawdzik et al. | 156/235 |
| 4,695,286 A * | 9/1987 | Vanier et al. | 8/471 |
| 4,703,597 A | 11/1987 | Eggemar | |
| 4,715,162 A | 12/1987 | Brightwell | |
| 4,738,071 A | 4/1988 | Ezard | |
| 4,752,497 A | 6/1988 | McConkey et al. | |
| 4,756,951 A | 7/1988 | Wang et al. | |
| 4,769,188 A * | 9/1988 | Graham et al. | 264/51 |
| 4,769,963 A | 9/1988 | Meyerson | |
| 4,818,595 A * | 4/1989 | Ellis | 442/68 |
| 4,819,932 A | 4/1989 | Trotter, Jr. | |
| 4,831,806 A | 5/1989 | Niese et al. | |
| 4,844,850 A * | 7/1989 | Harder | 264/129 |
| 4,845,907 A | 7/1989 | Meek | |
| 4,849,768 A | 7/1989 | Graham | |
| 4,905,442 A | 3/1990 | Daniels | |
| 4,908,345 A * | 3/1990 | Egashira et al. | 503/227 |
| 4,947,602 A | 8/1990 | Pollasky | |
| 5,029,425 A | 7/1991 | Bogataj | |
| 5,103,614 A | 4/1992 | Kawaguchi et al. | |
| 5,113,632 A | 5/1992 | Hanson | |
| 5,117,603 A | 6/1992 | Weintraub | |
| 5,136,823 A | 8/1992 | Pellegrino | |
| 5,165,816 A | 11/1992 | Parasin | |
| 5,179,812 A | 1/1993 | Itill | |
| 5,205,091 A | 4/1993 | Brown | |
| 5,215,811 A * | 6/1993 | Reafler et al. | 428/212 |
| 5,216,861 A | 6/1993 | Meyerson | |

| | | | | | | |
|---|---|---|---|---|---|---|
| 5,251,996 A | 10/1993 | Hiller et al. | | 6,421,970 B1 | 7/2002 | Martensson et al. |
| 5,253,464 A | 10/1993 | Nilsen | | 6,427,408 B1 | 8/2002 | Krieger |
| 5,283,102 A | 2/1994 | Sweet et al. | | 6,436,159 B1 | 8/2002 | Safta et al. |
| 5,295,341 A | 3/1994 | Kajiwara | | 6,438,919 B1 | 8/2002 | Knauseder |
| 5,335,473 A | 8/1994 | Chase | | 6,446,405 B1 | 9/2002 | Pervan |
| 5,348,778 A | 9/1994 | Knipp et al. | | 6,449,913 B1 | 9/2002 | Shelton |
| 5,349,796 A | 9/1994 | Meyerson | | 6,449,918 B1 | 9/2002 | Nelson |
| 5,350,544 A * | 9/1994 | Bambara et al. ............. 264/415 | | 6,453,632 B1 | 9/2002 | Huang |
| 5,390,457 A | 2/1995 | Sjölander | | 6,458,232 B1 | 10/2002 | Valentinsson |
| 5,401,456 A * | 3/1995 | Alesi et al. .................. 264/511 | | 6,460,306 B1 | 10/2002 | Nelson |
| 5,413,834 A | 5/1995 | Hunter et al. | | 6,461,636 B1 | 10/2002 | Arth et al. |
| 5,433,806 A | 7/1995 | Pasquali et al. | | 6,465,046 B1 | 10/2002 | Hansson et al. |
| 5,474,831 A | 12/1995 | Nystrom | | 6,490,836 B1 | 12/2002 | Moriau et al. |
| 5,497,589 A | 3/1996 | Porter | | 6,497,961 B2 | 12/2002 | Kang et al. |
| 5,502,939 A | 4/1996 | Zadok et al. | | 6,510,665 B2 | 1/2003 | Pervan |
| 5,540,025 A | 7/1996 | Takehara et al. | | 6,516,579 B1 | 2/2003 | Pervan |
| 5,567,497 A | 10/1996 | Zegler et al. | | 6,517,935 B1 | 2/2003 | Kornfält et al. |
| 5,570,554 A | 11/1996 | Searer | | 6,519,912 B1 | 2/2003 | Eckmann et al. |
| 5,597,024 A | 1/1997 | Bolyard et al. | | 6,521,314 B2 | 2/2003 | Tychsen |
| 5,630,304 A | 5/1997 | Austin | | 6,532,709 B2 | 3/2003 | Pervan |
| 5,653,099 A | 8/1997 | MacKenzie | | 6,533,855 B1 | 3/2003 | Gaynor et al. |
| 5,671,575 A | 9/1997 | Wu | | 6,536,178 B1 | 3/2003 | Pålsson et al. |
| 5,694,734 A | 12/1997 | Cercone et al. | | 6,546,691 B2 | 4/2003 | Peopolder |
| 5,706,621 A | 1/1998 | Pervan | | 6,551,694 B1 * | 4/2003 | Imamichi et al. ......... 428/195.1 |
| 5,736,227 A | 4/1998 | Sweet et al. | | 6,553,724 B1 | 4/2003 | Bigler |
| 5,768,850 A | 6/1998 | Chen | | 6,558,754 B1 | 5/2003 | Velin et al. |
| 5,797,175 A | 8/1998 | Schneider | | 6,558,799 B2 * | 5/2003 | Takeuchi et al. ......... 428/423.1 |
| 5,797,237 A | 8/1998 | Finkell, Jr. | | 6,565,919 B1 | 5/2003 | Hansson et al. |
| 5,823,240 A | 10/1998 | Bolyard et al. | | 6,568,148 B1 * | 5/2003 | Eisermann ................. 52/783.1 |
| 5,827,592 A * | 10/1998 | Van Gulik et al. ............. 428/44 | | 6,569,272 B2 | 5/2003 | Tychsen |
| 5,860,267 A | 1/1999 | Pervan | | 6,584,739 B2 * | 7/2003 | Zeif ........................... 52/263 |
| 5,882,569 A * | 3/1999 | Maes ......................... 264/293 | | 6,588,166 B2 | 7/2003 | Martensson et al. |
| 5,935,668 A | 8/1999 | Smith | | 6,591,568 B1 | 7/2003 | Palsson |
| 5,943,239 A | 8/1999 | Shamblin et al. | | 6,601,359 B2 | 8/2003 | Olofsson |
| 5,953,878 A | 9/1999 | Johnson | | 6,606,834 B2 | 8/2003 | Martensson et al. |
| 5,968,625 A | 10/1999 | Hudson | | 6,617,009 B1 | 9/2003 | Chen et al. |
| 5,985,397 A | 11/1999 | Witt et al. | | 6,635,174 B2 | 10/2003 | Berg et al. |
| 5,987,839 A | 11/1999 | Hamar et al. | | 6,641,629 B2 | 11/2003 | Safta et al. |
| 6,006,486 A | 12/1999 | Moriau et al. | | 6,646,088 B2 | 11/2003 | Fan et al. |
| 6,023,907 A | 2/2000 | Pervan | | 6,647,690 B1 | 11/2003 | Martensson |
| 6,063,444 A * | 5/2000 | Dax ........................... 427/272 | | 6,649,687 B1 | 11/2003 | Gheewala et al. |
| 6,065,262 A | 5/2000 | Motta | | 6,659,097 B1 | 12/2003 | Houston |
| 6,090,471 A * | 7/2000 | Abrams .................. 428/211.1 | | 6,672,030 B2 | 1/2004 | Schulte |
| 6,094,882 A | 8/2000 | Pervan | | 6,681,820 B2 | 1/2004 | Olofsson |
| 6,101,778 A | 8/2000 | Martensson | | 6,682,254 B1 | 1/2004 | Olofsson et al. |
| 6,119,423 A | 9/2000 | Costantino | | 6,775,545 B2 | 1/2004 | Chen et al. |
| 6,134,854 A | 10/2000 | Stanchfield | | 6,685,993 B1 | 2/2004 | Hansson et al. |
| 6,148,884 A | 11/2000 | Bolyard et al. | | 6,711,864 B2 | 3/2004 | Erwin |
| 6,150,009 A * | 11/2000 | Stecker ....................... 428/198 | | 6,711,869 B2 | 3/2004 | Tychsen |
| 6,168,866 B1 | 1/2001 | Clark | | 6,715,253 B2 | 4/2004 | Pervan |
| 6,182,410 B1 | 2/2001 | Pervan | | 6,723,438 B2 | 4/2004 | Chang et al. |
| 6,186,703 B1 | 2/2001 | Shaw | | 6,729,091 B1 | 5/2004 | Martensson |
| 6,205,639 B1 | 3/2001 | Pervan | | 6,745,534 B2 | 6/2004 | Kornfalt |
| 6,209,278 B1 | 4/2001 | Tychsen | | 6,761,008 B2 | 7/2004 | Chen et al. |
| 6,216,403 B1 | 4/2001 | Belbeoc'h | | 6,761,794 B2 | 7/2004 | Mott et al. |
| 6,216,409 B1 | 4/2001 | Roy et al. | | 6,763,643 B1 | 7/2004 | Martensson |
| D442,296 S | 5/2001 | Külik | | 6,764,568 B1 * | 7/2004 | Sud ............................ 156/245 |
| D442,297 S | 5/2001 | Külik | | 6,766,622 B1 | 7/2004 | Thiers |
| D442,298 S | 5/2001 | Külik | | 6,769,217 B2 | 8/2004 | Nelson |
| D442,706 S | 5/2001 | Külik | | 6,769,218 B2 | 8/2004 | Pervan |
| D442,707 S | 5/2001 | Külik | | 6,769,835 B2 | 8/2004 | Stridsman |
| 6,224,698 B1 | 5/2001 | Endo | | 6,772,568 B2 | 8/2004 | Thiers et al. |
| 6,238,798 B1 | 5/2001 | Kang et al. | | 6,786,019 B2 | 9/2004 | Thiers |
| 6,247,285 B1 | 6/2001 | Moebus | | 6,803,109 B2 | 10/2004 | Qiu et al. |
| D449,119 S | 10/2001 | Külik | | 6,805,951 B2 | 10/2004 | Kornfält et al. |
| D449,391 S | 10/2001 | Külik | | 6,823,638 B2 | 11/2004 | Stanchfield |
| D449,392 S | 10/2001 | Külik | | 6,841,023 B2 | 1/2005 | Mott |
| 6,300,279 B1 * | 10/2001 | Macedo ....................... 503/227 | | 6,888,147 B1 | 5/2005 | Hansson et al. |
| 6,324,803 B1 | 12/2001 | Pervan | | 6,931,811 B2 * | 8/2005 | Thiers ........................ 52/592.1 |
| 6,345,481 B1 | 2/2002 | Nelson | | 6,986,934 B2 * | 1/2006 | Chen et al. ............... 428/195.1 |
| 6,363,677 B1 | 4/2002 | Chen et al. | | 7,137,229 B2 | 11/2006 | Pervan |
| 6,397,547 B1 | 6/2002 | Martensson | | 7,171,998 B2 * | 2/2007 | Vogel ........................ 144/358 |
| 6,418,683 B1 | 7/2002 | Martensson et al. | | 2001/0029720 A1 | 10/2001 | Pervan |

| | | | | | |
|---|---|---|---|---|---|
| 2001/0034992 A1 | 11/2001 | Pletzer et al. | EP | 0903451 | 3/1999 |
| 2002/0007608 A1 | 1/2002 | Pervan | EP | 0855482 | 12/1999 |
| 2002/0007609 A1 | 1/2002 | Pervan | EP | 0877130 | 1/2000 |
| 2002/0014047 A1 | 2/2002 | Thiers | EP | 0969163 | 1/2000 |
| 2002/0020127 A1 | 2/2002 | Thiers et al. | EP | 0969164 | 1/2000 |
| 2002/0046528 A1 | 4/2002 | Pervan et al. | EP | 0974713 | 1/2000 |
| 2002/0056245 A1 | 5/2002 | Thiers | EP | 0843763 | 10/2000 |
| 2002/0106439 A1 | 8/2002 | Cappelle | EP | 0958441 | 7/2003 |
| 2002/0160114 A1 | 10/2002 | Cozzolino | EP | 1026341 | 8/2003 |
| 2002/0160680 A1 | 10/2002 | Laurence et al. | GB | 424057 | 2/1935 |
| 2003/0024200 A1 | 2/2003 | Moriau et al. | GB | 585205 | 1/1947 |
| 2003/0024201 A1 | 2/2003 | Moriau et al. | GB | 599793 | 3/1948 |
| 2003/0029115 A1 | 2/2003 | Moriau et al. | GB | 636423 | 4/1950 |
| 2003/0029116 A1 | 2/2003 | Moriau et al. | GB | 812671 | 4/1959 |
| 2003/0029117 A1 | 2/2003 | Moriau et al. | GB | 1033866 | 6/1966 |
| 2003/0033777 A1 | 2/2003 | Thiers et al. | GB | 1034117 | 6/1966 |
| 2003/0033784 A1 | 2/2003 | Pervan | GB | 1044846 | 10/1966 |
| 2003/0115812 A1 | 6/2003 | Pervan | GB | 1237744 | 6/1968 |
| 2003/0115821 A1 | 6/2003 | Pervan | GB | 1127915 | 9/1968 |
| 2003/0159385 A1 | 8/2003 | Thiers | GB | 1275511 | 5/1972 |
| 2003/0167717 A1 | 9/2003 | Garcia | GB | 1399402 | 7/1975 |
| 2003/0196405 A1 | 10/2003 | Pervan | GB | 1430423 | 3/1976 |
| 2003/0205013 A1 | 11/2003 | Garcia | GB | 2117813 | 10/1983 |
| 2003/0233809 A1 | 12/2003 | Pervan | GB | 2126106 | 3/1984 |
| 2004/0016196 A1 | 1/2004 | Pervan | GB | 2152063 | 7/1985 |
| 2004/0035078 A1 | 2/2004 | Pervan | GB | 2238660 | 6/1991 |
| 2004/0053038 A1 | 3/2004 | Kunz | GB | 2243381 | 10/1991 |
| 2004/0092006 A1 | 5/2004 | Lindekens et al. | GB | 2256023 | 11/1992 |
| 2004/0105994 A1 | 6/2004 | Lu et al. | JP | 3-169967 | 7/1991 |
| 2004/0139678 A1 | 7/2004 | Pervan | JP | 7-76923 | 3/1995 |
| 2004/0159066 A1 | 8/2004 | Thiers et al. | JP | 7-300979 | 11/1995 |
| 2004/0177584 A1 | 9/2004 | Pervan | WO | 98/38401 | 9/1938 |
| 2004/0200465 A1 | 10/2004 | Garcia et al. | WO | 84/02155 | 6/1984 |
| 2004/0206036 A1 | 10/2004 | Pervan | WO | 87/03839 | 7/1987 |
| 2004/0237447 A1 | 12/2004 | Thiers et al. | WO | 97/47834 | 12/1987 |
| 2004/0237448 A1 | 12/2004 | Thiers et al. | WO | 89/08539 | 9/1989 |
| 2004/0241374 A1 | 12/2004 | Thiers et al. | WO | 92/17657 | 10/1992 |
| 2004/0244322 A1 | 12/2004 | Thiers et al. | WO | 93/13280 | 7/1993 |
| 2004/0250493 A1 | 12/2004 | Thiers et al. | WO | 93/19910 | 10/1993 |
| 2004/0255541 A1 | 12/2004 | Thiers et al. | WO | 94/01628 | 1/1994 |
| 2004/0258907 A1 | 12/2004 | Kornfalt et al. | WO | 94/26999 | 11/1994 |
| 2005/0003149 A1 | 1/2005 | Kornfalt et al. | WO | 94 126999 | 11/1994 |
| 2005/0016099 A1 | 1/2005 | Thiers | WO | 95/06176 | 3/1995 |
| | | | WO | 96/27719 | 9/1996 |
| | | | WO | 96/27721 | 9/1996 |

FOREIGN PATENT DOCUMENTS

| | | | | | |
|---|---|---|---|---|---|
| CA | 991373 | 6/1976 | WO | 96/30177 | 10/1996 |
| CA | 2226286 | 12/1997 | WO | 97/47834 | 12/1997 |
| CA | 2252791 | 5/1999 | WO | 98/24495 | 6/1998 |
| CA | 2 289309 | 7/2000 | WO | 98/24994 | 6/1998 |
| DE | 296 02 329 U1 | 7/1996 | WO | 99 140273 | 8/1999 |
| DE | 19532819 | 3/1997 | WO | 99/66151 | 12/1999 |
| DE | 19952021 | 5/2000 | WO | 99 166152 | 12/1999 |
| DE | 19903912 | 8/2000 | WO | 00 166856 | 11/2000 |
| DE | 199 52 021 C1 | 5/2001 | WO | 01/48333 | 7/2001 |
| EP | 0 248127 | 12/1987 | WO | 01 166876 | 9/2001 |
| EP | 0248127 | 12/1987 | WO | 02/04206 | 1/2002 |
| EP | 0623724 | 11/1994 | WO | 02/45955 | 6/2002 |
| EP | 0652340 | 5/1995 | | | |
| EP | 0799679 | 10/1997 | | | |

OTHER PUBLICATIONS

European Search Report for EP 03021069, dated Oct. 3, 2005.

| | | | | | |
|---|---|---|---|---|---|
| EP | 0849416 | 6/1998 | | | |
| EP | 0698162 | 9/1998 | | | |

* cited by examiner

WOOD FIBERBOARD

BACKGROUND OF THE INVENTION

1. Field of the Invention

The invention relates to a wood fiberboard, in particular a floor panel, comprising an HDF support board with a top side and an underside, the top side having a decoration, preferably a wood or tile decoration, and to a process for producing such a wood fiberboard.

2. Background Description

Floor panels with a wood-fiber support board are usually referred to as laminate panels and have been commercially available for many years as a substitute for parquet flooring. The desired decoration (parquet, woodgrain, tiles, etc.) is printed onto a paper web, which is then coated with resin and rolled onto a roll. At the floor manufacturer's, the decorative web which has been prefabricated in this way is positioned on the support board and pressed. As a result of the operations of printing the decoration on to the paper web, of subsequently sealing the paper web with synthetic resin and of then connecting the decorative layer to the support board by pressure and temperature, the dimensions of the paper web change. According to the person skilled in the art, the paper grows. The paper grows both in length (increase in length) and in width (increase in width). If this decorative board is then to be cut to size to form individual panels, the increase in length and width has to be taken into account because, otherwise, the decoration would be distributed unevenly on the individual panels. This would result in the floor made up of an unevenly distributed decorative layer having the decorations offset along the connecting edges of the panels. Even if the decorations are only offset by a few millimeters, they are obvious to the observer, this having an adverse effect on the esthetic appearance and thus reducing the quality of the covered floor.

In order for it to be possible to carry out production with appropriate quality, the paper growth has to be detected and the saw which saws the panels from the support board has to be set correspondingly. Manual setting is very time-consuming. DE 100 19 054 C1 describes a process which is intended for cutting panels to size from a support board and by means of which the saw can be automatically adapted to the paper growth. Cameras are necessary for this purpose, the cameras determining the actual position of defined points of the decoration. The actual position is then compared with the desired position and the deviation of the width or length dimension is determined, with the result that the saw can be set correspondingly.

In order to optimize the cutting, fairly high outlay is thus necessary, and this increases the cost of the production of high-grade panels. In order further to match the appearance of the laminate panel to the appearance of a natural-wood panel, a relief-containing female die may be provided in the press in which the decorative layer is pressed with the support board, a relief which corresponds to the woodgrain being stamped into the synthetic resin layer by means of said die. Since the paper growth is not reproducible, it is not possible to make the relief correspond fully with the decoration. The joints of a tiled surface cannot be stamped into the surface of the synthetic-resin layer since deviations would be immediately visible here.

SUMMARY OF THE INVENTION

Taking this problem as the departure point, the intention is to improve the wood fiberboard described in the introduction.

DETAILED DESCRIPTION OF EMBODIMENTS OF THE INVENTION

Figure 1:
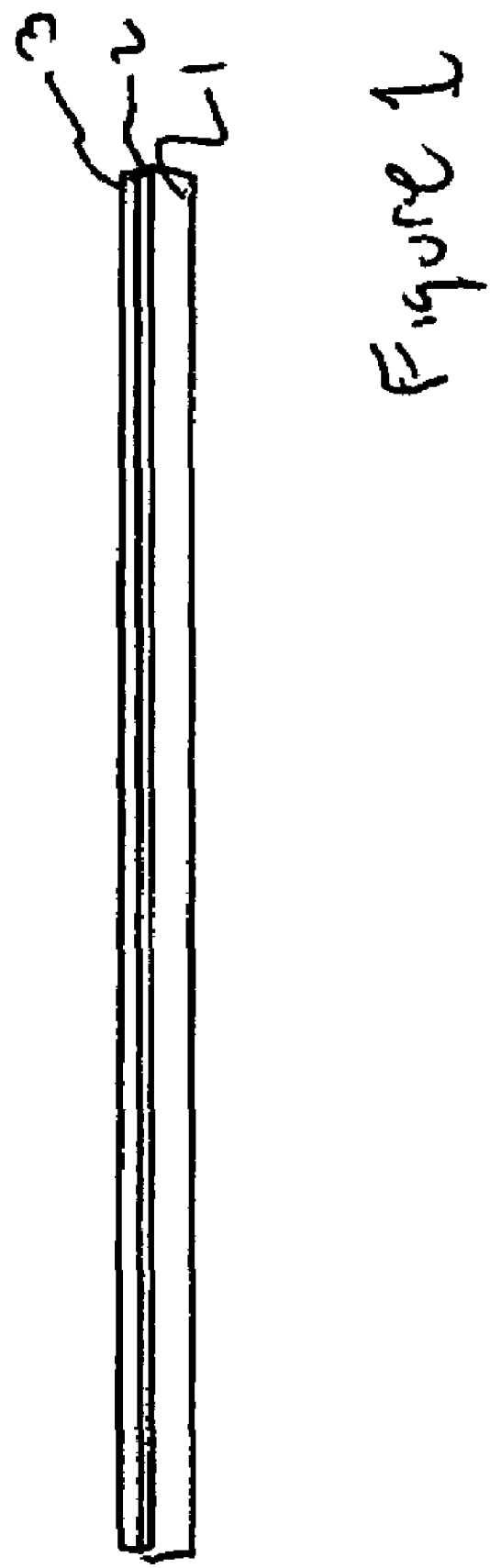
FIG. 1 shows an aspect of the invention.

The problems is solved, in the case of a wood fiberboard 1 of the generic type, in that the decoration 2 is printed directly on top the top surface of the support board and is covered by at least one layer of a transparent synthetic resin 3, preferably melamine resin or urea resin.

In addition, it is also possible for the decoration to be printed onto the underside of the support board and to be covered by at least one layer of a transparent synthetic resin. If appropriate, the underside and/or the top side of the support board may be provided with a relief corresponding to the decoration, this relief being pressed into the synthetic-resin layer.

By virtue of this configuration, the paper layer is eliminated. During pressing of the synthetic-resin layer, the decoration changes neither in length nor in width. The saw which is subsequently used to cut panels to size, may be preset. It is possible to stamp into the synthetic-resin layer of the board designed according to the invention even the most intricate reliefs, which correspond precisely with the decoration. The production costs of high-quality panels are considerably reduced. A further saving is achieved in that the paper layer is dispensed with.

The decoration is preferably covered by two layers of a synthetic resin, the layer which is applied directly to the decoration having corundum particles for increasing the abrasion resistance.

A process for producing the wood fiberboard according to the invention is distinguished by the following steps:

a) a decoration, preferably a wood or tile decoration, is printed onto one or two sides of the board;
b) a screen roller is used to spread one or more synthetic-resin layers on the side with the decoration (top side) and the sides located opposite the latter (underside);
c) the synthetic-resin layers are pressed with the board in a known manner in a short-cycle-press.

The absence of paper layers prevents the resulting boards from warping, which could be produced by the inherent tensile force of the papers. Short pressing times may be realized as a result of the thin layers.

Instead of HDF (High Density Fiberboard), it is also possible for the support board to be made of MDF (Medium Density Fiberboard) or also a conventional chipboard with a correspondingly finely distributed cover layer, from which, for example, smaller panels used for furniture construction can then be sawn.

Boards which are produced in this way may also be used as floors in that they may be sawn to form panels in a format appropriate to the decoration.

The invention claimed is:

1. A wood fiberboard, composed of a panel comprising a support board with a top side and an underside, the top side having a decoration, of a wood or tile decoration, wherein the decoration is printed onto the top side of the support board and is covered by at least one layer of a transparent synthetic resin, and the support board is made of one of HDF, MDF, and chipboard, and wherein the top side has a relief corresponding to the decoration.

2. The wood fiberboard, according to claim 1, wherein the decoration is printed on to the underside of the support board.

3. The wood fiberboard, according to claim 1, wherein the decoration is covered by two layers of a synthetic resin, the layer which is applied directly to the decoration having corundum particles for increasing the abrasion resistance.

4. The wood fiberboard, according to claim 1, wherein the underside also has a relief corresponding to the decoration.

5. The wood fiberboard, according to claim 1, wherein the decoration is covered by two layers of a synthetic resin, the layer which is applied directly to the decoration having corundum particles for increasing the abrasion resistance.

6. The wood fiberboard, according to claim 1, wherein the decoration is printed directly on the top side of the support board.

7. The wood fiberboard, according to claim 1, wherein the support board is composed of HDF.

8. A wood fiberboard, composed of a panel comprising a support board with a top side and an underside, the top side having a decoration, of a wood or tile decoration, wherein the decoration is printed directly onto the top side of the support board and is covered by a paper free layer of a transparent synthetic resin, and the support board is made of one of HDF, MDF, and chipboard.

9. The wood fiberboard of claim 8, wherein the support board is composed of HDF.

\* \* \* \* \*